(12) United States Patent
Campbell (10) Patent No.: US 9,898,389 B2
(45) Date of Patent: Feb. 20, 2018

(54) DEBUGGING A TRANSACTION IN A REPLICA EXECUTION ENVIRONMENT

(71) Applicant: International Business Machines Corporation, Armonk, NY (US)

(72) Inventor: Randall T. Campbell, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 98 days.

(21) Appl. No.: 14/989,895

(22) Filed: Jan. 7, 2016

(65) Prior Publication Data

US 2017/0199808 A1    Jul. 13, 2017

(51) Int. Cl.
*G06F 11/00* (2006.01)
*G06F 11/36* (2006.01)

(52) U.S. Cl.
CPC ...... *G06F 11/3664* (2013.01); *G06F 11/3644* (2013.01)

(58) Field of Classification Search
CPC .............. G06F 11/362; G06F 11/3632; G06F 11/3644; G06F 11/3664; G06F 11/366; G06F 2201/87
See application file for complete search history.

(56) References Cited

U.S. PATENT DOCUMENTS

| | | | |
|---|---|---|---|
| 2007/0113218 A1 | 5/2007 | Nolan et al. | |
| 2007/0288902 A1 | 12/2007 | Lev et al. | |
| 2011/0321015 A1 | 12/2011 | Chew | |
| 2012/0144236 A1* | 6/2012 | Black | H04L 41/145 714/25 |
| 2013/0139128 A1* | 5/2013 | Jones | G06F 11/3664 717/128 |
| 2015/0058823 A1 | 2/2015 | Cai et al. | |
| 2016/0070639 A1* | 3/2016 | Matthiesen | G06F 11/3636 717/128 |
| 2016/0378637 A1* | 12/2016 | Gamble | G06F 11/362 707/702 |

* cited by examiner

*Primary Examiner* — Marc Duncan
(74) *Attorney, Agent, or Firm* — Cantor Colburn LLP; William A. Kinnaman, Jr.

(57) ABSTRACT

A computer-implemented method for debugging a transaction includes receiving a transaction in a transaction management system, where the transaction management system includes one or more message-processing regions (MPRs). A request to debug the transaction is identified. A debug session for the transaction is isolated from the one or more MPRs, by a computer processor, and this isolation is responsive to identifying the request to debug the transaction. Performing the isolation includes identifying a first MPR of the one or more MPRs, and deploying a replica MPR having an execution environment copied from the first MPR. Performing the isolation further includes invoking, inside the replica MPR, a debug-specific application program configured to perform the transaction.

15 Claims, 3 Drawing Sheets

DEBUGGING A TRANSACTION IN A REPLICA EXECUTION ENVIRONMENT

BACKGROUND

Embodiments of the present invention relate to transaction management systems and, more specifically, to debugging a transaction in a replica execution environment.

The Information Management System (IMS), by International Business Machines®, is a database and transaction management system. The IMS transaction processing environment provides a control region as well as dependent regions for message processing. One type of such dependent region is a message-processing region (MPR), also referred to as an online message region. MPRs are organized into message classes, which may be used for load distribution across the MPRs, and where an MPR of a certain class serves transactions assigned to that class. The control region manages incoming transactions and assigns them to the MPRs and other dependent regions as appropriate.

In the form of messages, the control region receives transactions entered from terminals. Generally, a transaction involves executing an associated program given some input data provided at a terminal. Upon receiving a message describing a transaction, the control region queues the message. Later, when it is deemed time to handle the transaction, the control region passes the message to an MPR associated with the class of the transaction, and the MPR starts the associated program to process the input data. After the MPR completes the transaction, the control region sends a response back to the terminal as appropriate.

If one or more users are debugging transactions that have been routed to the MPRs of a specific class, that class may not have any available MPRs to dispatch other work. Because debug sessions take much longer to execute than do standard transactions, this can result in a severe degradation of the transaction scheduling environment.

SUMMARY

According to an embodiment of this disclosure, a computer-implemented method for debugging a transaction includes receiving a transaction in a transaction management system, where the transaction management system includes one or more message-processing regions (MPRs). A request to debug the transaction is identified. A debug session for the transaction is isolated from the one or more MPRs, by a computer processor, and this isolation is responsive to identifying the request to debug the transaction. Performing the isolation includes identifying a first MPR of the one or more MPRs, and deploying a replica MPR having an execution environment copied from the first MPR. Performing the isolation further includes invoking, inside the replica MPR, a debug-specific application program configured to perform the transaction.

In another embodiment, a system for debugging a transaction includes a memory having computer readable instructions and one or more processors for executing the computer readable instructions. The computer readable instructions include receiving a transaction in a transaction management system, where the transaction management system includes one or more MPRs. Further according to the computer readable instructions, a request to debug the transaction is identified. A debug session for the transaction is isolated from the one or more MPRs, and this isolation is responsive to identifying the request to debug the transaction. Performing the isolation includes identifying a first MPR of the one or more MPRs, and deploying a replica MPR having an execution environment copied from the first MPR. Performing the isolation further includes invoking, inside the replica MPR, a debug-specific application program configured to perform the transaction.

In yet another embodiment, a computer program product for debugging a transaction includes a computer readable storage medium having program instructions embodied therewith. The program instructions are executable by a processor to cause the processor to perform a method. The method includes receiving a transaction in a transaction management system, where the transaction management system includes one or more MPRs. Further according to the method, a request to debug the transaction is identified. A debug session for the transaction is isolated from the one or more MPRs, and this isolation is responsive to identifying the request to debug the transaction. Performing the isolation includes identifying a first MPR of the one or more MPRs, and deploying a replica MPR having an execution environment copied from the first MPR. Performing the isolation further includes invoking, inside the replica MPR, a debug-specific application program configured to perform the transaction.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Various embodiments of this disclosure may simplify the process of debugging a transaction from the developer's perspective in a transaction management system, such as the Information Management System (IMS). Some embodiments may also reduce configuration and administration overhead required to support debugging. To this end, a debugging system according to this disclosure may exploit existing message routing and control mechanisms of the transaction system to provide isolated debug sessions.

Figure 1:
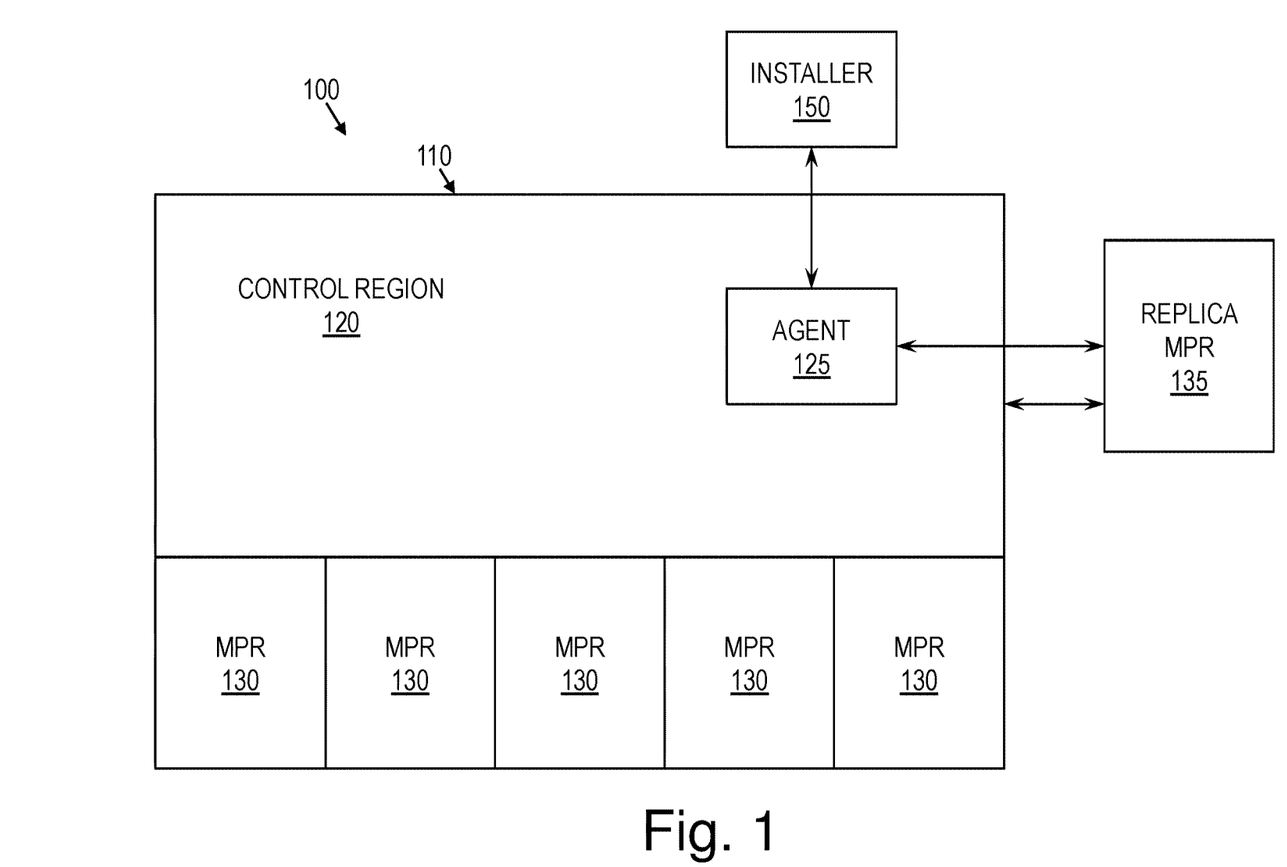
FIG. 1 is a block diagram of a debugging system, according to some embodiments of this disclosure.

FIG. 1 is a block diagram of a debugging system 100, according to some embodiments of this disclosure. As shown, the debugging system 100 may be integrated into, or in communication with a transaction management system 110, such as IMS, which may include a control region 120 and one or more message-processing regions (MPRs) 130. The control region 120 may manage message processing. Each message may encapsulate a transaction specifying a program to executed, and each transaction belongs to a class of one or more available classes. Each MPR 130 may be associated with a particular class and may be configured to process transactions, and thus execute associated programs, of that class. Generally, when the control region 120 receives a message from a terminal, the control region 120 may determine a class of the transaction in the message and may route the message to an MPR 130 associated with that class.

In some embodiments, the debugging system 100 may further include an agent 125 inside the control region 120. On behalf of the debugging system 100, the agent 125 may perform tasks within the control region or that require privileges of the control region 120.

Occasionally, the control region 120 may receive transactions to be debugged. In some embodiments, when the control region 120 receives such a transaction to be debugged, the debugging system 100 may deploy a replica environment for the transaction, thus keeping the debug session for the transaction isolated from the remainder of the transaction workload. Specifically, embodiments of the debugging system 100 may isolate a program of a transaction at the message level. A replica transaction may be generated based on the original transaction's application control block (ACB). The ACB may include a program specification block (PSB) for the associated program and, if applicable, one or more database definitions (DBDs) required to schedule the program. The replica transaction may run in a replica MPR 135 that is a copy of the MPR 130 to which the original transaction was assigned.

Before transactions can be debugged according to the debugging system 100 described herein, some aspects of the debugging system 100 may be installed by an installer. To this end, the installer 150 may identify the quantity of transactions that can be debugged simultaneously. This quantity may be a fixed number, which may be customizable and may be defined in a data-only load module. The installer 150 may provide a quantity of debug-specific classes equal to this quantity of transactions that can be simultaneously debugged. These classes may be dedicated for debugging purposes.

A set of debug-specific application programs may be defined, such as by a system programmer, such that the program specification block (PSB) for each of these application programs can be generated dynamically. For instance, the application programs may be defined with the dynamic option (DOPT) feature, which may enable each application program's PSB to be defined or modified after the transaction management system 110 has started. In some embodiments, the names of these application programs may comply with an established pattern recognizable by the debugging system 100 during execution. Further, each such application program may have at least two defined transactions: a conversational transaction and a non-conversational transaction. Generally, each transaction to be debugged may be conversational or non-conversational, and the application programs may thus be enabled to behave conversationally, or not, based on the transaction being debugged.

The installer 150 may create these application programs, which may then become resources available to the control region 120. For example, the following defines an application program and its conversational and non-conversational transactions in an IMS, where "nnn" corresponds to the name of the class that serves the transactions and "sss" represents the size of a scratch pad area:

APPLCTN DOPT, PSB=EQATInnn, LANG=ASSEM, PGMTYPE=(TP)
TRANSACT CODE=(EQATInnn), MSGTYPE=(MULT-SEG, RESPONSE), CLASS=nnn
TRANSACT CODE=(EQACInnn), MSGTYPE=(MULT-SEG, RESPONSE), CLASS =nnn, SPA=(sss, STRUNC)

In some embodiments, an ACB library (ACBLIB) data set may be created, such as by the system programmer, to contain the PSBs for these application programs. This data set may be made available to the control region 120 as part of the ACBLIBs, such as by being added to added to the end of the Information Management System ACB A (IMSACBA) or the Information Management System ACB B (IMSACBB) concatenation.

When a user wants to debug a transaction, the user can specify in the message a name for the transaction, as well as one or more parameters that the debugging system 100 may use. For instance, the parameters may explicitly specify that the user wishes to debug the transaction. The use of these parameters may be treated as a request to debug the transaction. The debugging system 100 may detect the parameters in the message and, as a result, may recognize the request to debug the transaction.

Upon receiving the request for debugging, the debugging system 100 may assign the transaction to one of the classes discussed above that are reserved for debugging. The debugging system 100 may then locate the ACBLIB data set containing the PSBs for the application programs used for debugging. To this end, in some embodiments, such as on a machine with the z/OS operating system, the debugging system 100 may use the multiple virtual storage (MVS) subsystem interface to read the job control language input (JCLIN) for the control region 120, and may thereby determine the ACBLIB concatenation.

The transaction for which debugging is requested may be associated with a PSB defining the program to be performed when processing the transaction. The debugging system 100 may interrogate the transaction's settings to identify the PSB associated with the transaction. The debugging system 100 may then locate the ACB of the program, which may be performed by searching the ACBLIBs to locate the ACB associated with PSB of the transaction.

The debugging system 100 may replicate the transaction into a replica transaction. This may occur by copying the ACB of the program from the ACBLIBs, and assigning to the copy the program name provided by the user. As the copy is made, the name provided in the PSB of that copied ACB may be changed to the program name of a debug-specific application program. As discussed above, this program name may fit a pattern that makes it recognizable to the debugging system 100.

The debugging system 100 may interrogate the transaction's settings to determine the class to which the transaction was originally assigned, and may then identify an MPR 130 that serves that class. The debugging system 100 may clone the MPR 130 to create a new replica MPR 135 that serves the debug-specific class to which the transaction is now assigned. For example, in some embodiments, the debugging system 100 may use the MVS subsystem interface to read the JCLIN for the MPR 130 and clone the MPR 130 to create the replica MPR 135 to serve the same class. The debugging system 100 may then instruct the replica MPR 135 to debug the replica transaction. In some embodiments, this may include inserting a CEE options data definition (CEEOPTS DD) card or modify the existing CEEOPTS DD to specify a TEST parameter specific to the user requesting the debugging.

The debugging system 100 may start the replica MPR 135, thus bringing it online to serve transactions of the same class as the user's transaction. Further, the debugging system 100 may save in a table the user's request for debugging the replica transaction. The table may be used for routing purposes, to ensure the debugging preferences are applied to the user's debugging session of the replica transaction when needed.

When the control region receives a message for the original transaction, the control region 120 may invoke a user exit, such as a DFSMSCE0 exit, to determine whether the transaction should be rerouted. According to some embodiments, the user exit may compare the execution environment (e.g., the transaction name, the user for the transaction, and the contents of the message) to the table, so as to determine whether the transaction is meant for debugging. If so, as is the case for the transaction in question, the message for the transaction may be rerouted to the replica transaction, and the replica transaction may be processed by the replica MPR 135, which is configured for debugging a transaction of the same class of the replica transaction as described above.

When the transaction executes in the replica MPR 135, the assigned debug-specific application program may be executed. Because the ACB of this debug-specific application program may have been created as a copy of the original transaction's ACB, the parameters passed to the replica transaction may be identical to those expected by the original transaction.

The debug-specific application program may bring the replica transaction's application program into memory, such as by using the MVS LOAD service, and may call the debug-specific application program with the parameters originally provided by the user. The debug-specific application program may then run with debugging active, which may be due to the TEST parameter specification.

For example, suppose a user wants to debug conversational transaction ABC, which runs program ABCP, where this original transaction is assigned to class 10. The user registers to debug the transaction using the debug system 100. As a result, the debug system 100 may reserve a slot in the table for the user, identifying for the user a reserved private class, such as class 20, along with an ordinal number corresponding to the slot in the table, such as 1. The user may wish to trap and debug the transaction only if a message for the transaction ABC contains a particular string, S, and this criteria may be stored in the table.

If transaction ABC is executed with a message Y, which excludes S, the debug system 100 may see that transaction ABC has been requested, but that the message does not match the user's criteria. As a result, the debug system 100 may allow the transaction to continue to run in its original environment (i.e., the MPR 130 to which it would be assigned conventionally) and not be debugged. Therefore, transaction ABC may be scheduled in a class-10 region.

Alternatively, ABC may be executed with a message S+X, which includes the string S and thus matches the user's criteria. As a result, the debug system 100 may reroute the transaction to the replica transaction, such as EQAC0201, running in the class-20 replica MPR 135. In this case, the conversational version of the replica transaction may be chosen because original transaction ABC is conversational in this example.

If the user no longer wishes to trap transaction ABC for debugging, the user can deregister, and in response, the debug system 100 may clear the corresponding slot in the table. If the user wishes to debug non-conversational transaction XYZ, the debug software 100 may reserve the same or a different slot in the table, thus enabling transaction XYZ to be debugged through the debug system 100.

Figure 2:
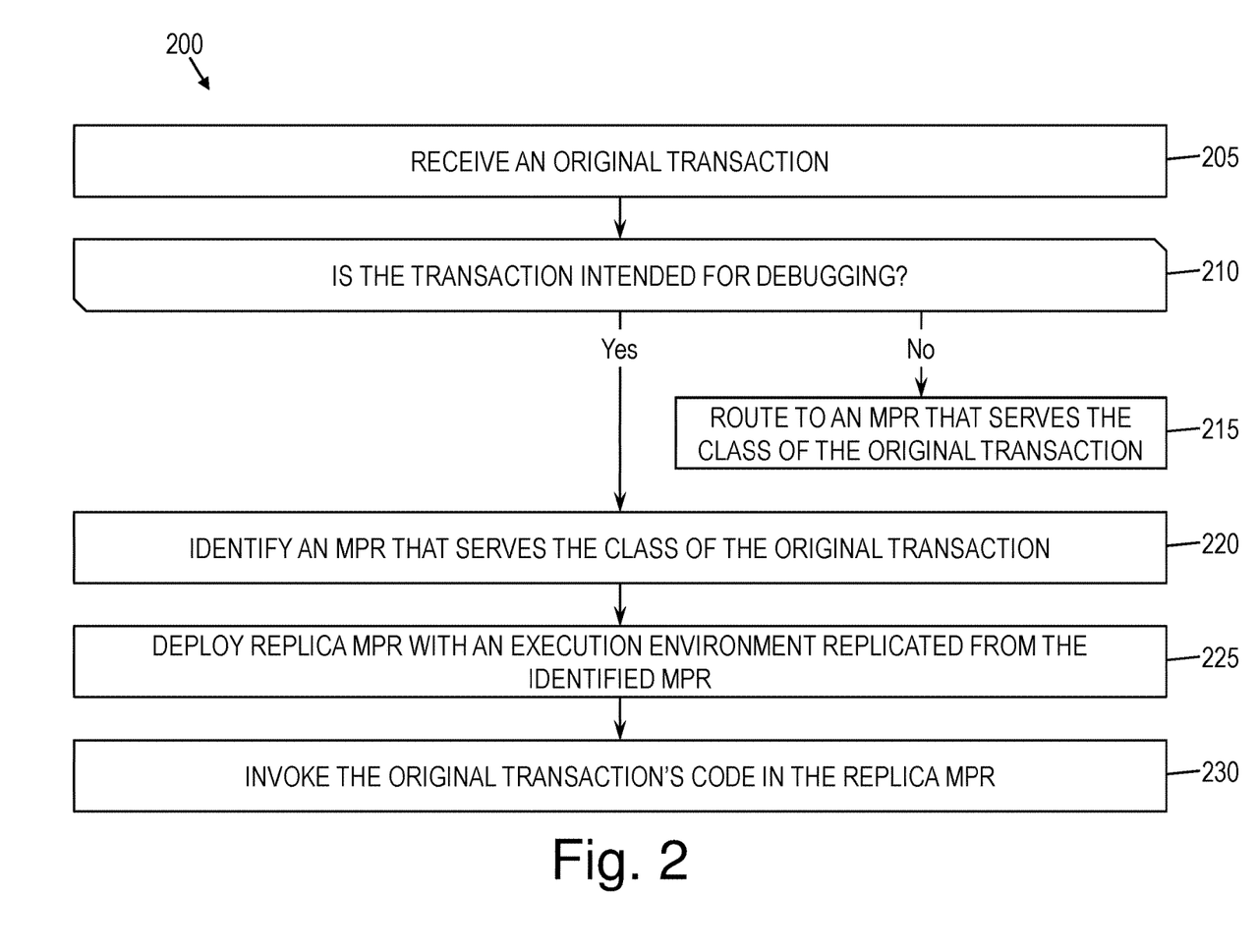
FIG. 2 is a flow diagram of a method for debugging a transaction, according to some embodiments of this disclosure.

To summarize, FIG. 2 is a flow diagram of method 200 for processing a transaction to be debugged, according to some embodiments of this disclosure. As shown, at block 205, the control region 120 may receive an original transaction. At decision block 210, the debug system 100 may determine whether the original transaction is meant to be debugged. If it is determined that the original transaction is not for debugging, then at block 215 the control region 120 may route the original transaction to an MPR 130 that serves the class of the original transaction. However, if it is determined that the original transaction is meant to be debugged, then at block 220, the debugging system 100 may identify an MPR 130 associated with the class of the original transaction. At block 225, the debugging system 100 may deploy a replica MPR 135 having a debug environment that is a replica of the identified MPR 130. At block 230, the control region 120 may invoke the transaction's code, in the form of a debug-specific application program of a replica transaction, thus keeping the debug session of the transaction isolated from the remainder of the transaction workload.

Figure 3:
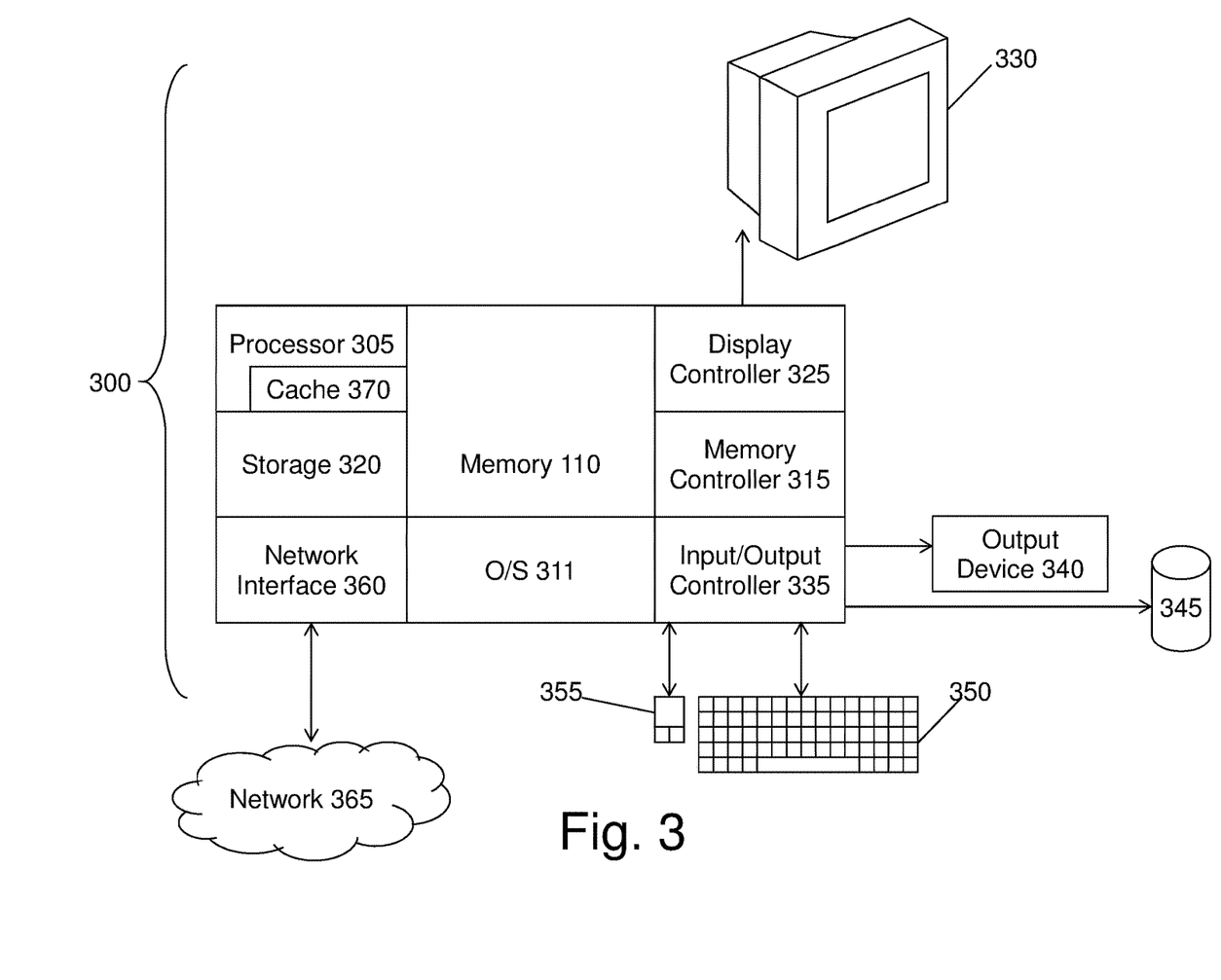
FIG. 3 is a block diagram of a computer system for implementing some or all aspects of the debugging system, according to some embodiments of this disclosure.

FIG. 3 illustrates a block diagram of a computer system 300 for use in implementing a debugging system 100 or method 200 according to some embodiments. The debugging systems 100 and methods 200 described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer. For instance, the control region 120, the one or more MPRs 130, and the agent 125 may be implemented on a computer system 300 as hardware, software, or both.

In some embodiments, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computer system 300, a semiconductor based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid state drive. The stored instructions in memory 310 or in storage 320 may include those enabling the processor to execute one or more aspects of the debugging systems 100 and methods 200 of this disclosure.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Debugging systems 100 and methods 200 according to this disclosure may be embodied, in whole or in part, in computer program products or in computer systems 300, such as that illustrated in FIG. 3.

Technical effects and benefits of some embodiments include isolating debug users at the message level, rather than only at the transaction level, while preserving the execution environments for the original transactions to be debugged, in the form of replica execution environments. In other words, in some embodiments, if a message doesn't match a message for which debugging was requested, no debugging is performed in a replica execution environment.

As a result, debugging can be performed without monopolizing the MPRs 130, thus enabling other transactions to proceed more efficiently.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for debugging a transaction, comprising:
   receiving a transaction in a transaction management system, the transaction management system comprising one or more message-processing regions (MPRs);
   identifying a request to debug the transaction; and
   isolating, from the one or more MPRs, by a computer processor, a debug session for the transaction, the isolating being responsive to identifying the request to debug the transaction and comprising:
     identifying a first MPR of the one or more MPRs;
     deploying a replica MPR having an execution environment copied from the first MPR;
     generating a replica transaction by copying an application control block of the transaction; and
     invoking, inside the replica MPR, a debug-specific application program configured to perform the transaction, wherein the invoking, inside the replica MPR, the debug-specific application program configured to perform the transaction comprises invoking the replica transaction.

2. The computer-implemented method of claim 1, wherein the transaction is associated with an original class, wherein each of the one or more MPRs is dedicated to serving a corresponding assigned class, and wherein the first MPR is dedicated to serve the original class.

3. The computer-implemented method of claim 2, further comprising:
   determining a count of transactions that are simultaneously debuggable on the transaction management system;

providing a plurality of debug-specific classes in a quantity equal to the count of transactions that are simultaneously debuggable on the transaction management system; and reassigning the transaction to a debug-specific class of the plurality of debug-specific classes.

4. The computer-implemented method of claim 3, further comprising assigning the replica MPR to serve the debug-specific class to which the transaction is reassigned.

5. The computer-implemented method of claim 1, further comprising:

generating the debug-specific application program to comprise a dynamic program specification block and to have a recognizable name;

wherein the generating the replica transaction comprises assigning to the replica transaction a program name matching the recognizable name of the debug-specific application program.

6. A system for debugging a transaction, comprising:

a memory having computer readable instructions; and one or more processors for executing the computer readable instructions, the computer readable instructions comprising:

receiving a transaction in a transaction management system, the transaction management system comprising one or more message-processing regions (MPRs);

identifying a request to debug the transaction; and isolating, from the one or more MPRs, a debug session for the transaction, the isolating being responsive to identifying the request to debug the transaction and comprising:

identifying a first MPR of the one or more MPRs;

deploying a replica MPR having an execution environment copied from the first MPR;

generating a replica transaction by copying an application control block of the transaction; and invoking, inside the replica MPR, a debug-specific application program configured to perform the transaction, wherein the invoking, inside the replica MPR, the debug-specific application program configured to perform the transaction comprises invoking the replica transaction.

7. The system of claim 6, wherein the transaction is associated with an original class, wherein each of the one or more MPRs is dedicated to serving a corresponding assigned class, and wherein the first MPR is dedicated to serve the original class.

8. The system of claim 7, the computer readable instructions further comprising:

determining a count of transactions that are simultaneously debuggable on the transaction management system;

providing a plurality of debug-specific classes in a quantity equal to the count of transactions that are simultaneously debuggable on the transaction management system; and reassigning the transaction to a debug-specific class of the plurality of debug-specific classes.

9. The system of claim 8, the computer readable instructions further comprising assigning the replica MPR to serve the debug-specific class to which the transaction is reassigned.

10. The system of claim 6, the computer readable instructions further comprising:

generating the debug-specific application program to comprise a dynamic program specification block and to have a recognizable name;

wherein the generating the replica transaction comprises assigning to the replica transaction a program name matching the recognizable name of the debug-specific application program.

11. A computer program product for debugging a transaction, the computer program product comprising a non-transitory computer readable storage medium having program instructions embodied therewith, the program instructions executable by a processor to cause the processor to perform a method comprising:

receiving a transaction in a transaction management system, the transaction management system comprising one or more message-processing regions (MPRs);

identifying a request to debug the transaction; and isolating, from the one or more MPRs, a debug session for the transaction, the isolating being responsive to identifying the request to debug the transaction and comprising:

identifying a first MPR of the one or more MPRs;

deploying a replica MPR having an execution environment copied from the first MPR;

generating a replica transaction by copying an application control block of the transaction; and invoking, inside the replica MPR, a debug-specific application program configured to perform the transaction, wherein the invoking, inside the replica MPR, the debug-specific application program configured to perform the transaction comprises invoking the replica transaction.

12. The computer program product of claim 11, wherein the transaction is associated with an original class, wherein each of the one or more MPRs is dedicated to serving a corresponding assigned class, and wherein the first MPR is dedicated to serve the original class.

13. The computer program product of claim 12, the method further comprising:

determining a count of transactions that are simultaneously debuggable on the transaction management system;

providing a plurality of debug-specific classes in a quantity equal to the count of transactions that are simultaneously debuggable on the transaction management system;

reassigning the transaction to a debug-specific class of the plurality of debug-specific classes; and assigning the replica MPR to serve the debug-specific class to which the transaction is reassigned.

14. The computer program product of claim 11, the method further comprising:

generating the debug-specific application program to comprise a dynamic program specification block and to have a recognizable name;

wherein the generating the replica transaction comprises assigning to the replica transaction a program name matching the recognizable name of the debug-specific application program.

15. The computer program product of claim 11, the method further comprising:

generating the debug-specific application program to comprise a dynamic program specification block and to have a recognizable name;

wherein the generating the replica transaction comprises assigning to the replica transaction a program name matching the recognizable name of the debug-specific application program.

* * * * *